United States Patent Office 2,892,811
Patented June 30, 1959

2,892,811
RESIN

Ernest P. Irany, Worcester, Mass., assignor to Norton Company, Worcester, Mass., a corporation of Massachusetts No Drawing. Application January 29, 1954
Serial No. 407,163

7 Claims. (Cl. 260—72)

The invention relates to resins. The invention has particular reference to the requirements of a bonding agent for abrasive articles. However ,it also represents a plastic for general utility purposes.

One object of the invention is to provide liquid bonding resins which can be incorporated into an abrasive composition by mechanically mixing with abrasive grain, fillers, etc., prior to molding the abrasive article. Another object of the invention is to provide liquid resins containing substantially no solvent or dispersing agent which has to be removed. Another object of the invention is to provide liquid resins which are stable under storage and mixing conditions but convertible to a state of insolubility and infusibility under the action of elevated temperatures with or without catalysts. Another object of the invention is to provide liquid resins which have no tendency to swell during curing. Another object of the invention is to provide liquid resins which do not require the presence of water absorbing agents to bind water liberated during the curing process. Another object of the invention is to provide liquid resins as bonding agents for abrasives capable of producing porous abrasive articles of high strength with good abrasive action. Another object of the invention is to provide a superior casting resin. Another object of the invention is to provide a superior laminating resin. Another object of the invention is to provide a superior core binding resin.

As conducive to a clearer understanding of the present invention I will further develop the objectives thereof. In the production of abrasive articles, e.g., grinding wheels, grains of abrasive material are held together by a bonding agent in a structure of exactly controlled porosity. In order to perform its function, the bonding agent must be distributed in continuous form throughout this structure and it must attach itself firmly to the abrasive grain surfaces. To achieve these results in the manufacture of abrasive articles of the type involved, the bonding agent must be initially fluid or else it must melt at some stage of the process of making the abrasive article.

If the bonding material is a solid at the temperature at which the abrasive composition is mixed, as, e.g., in the case of ceramic materials (vitrified bonds) or most thermosetting organic plastics such as phenolformaldehyde resins which are in most common use, the bond is established only at the temperature of firing or curing to which the molded article is subsequently exposed. Under this condition the molten bonding agent is distributed merely by flowing over and between the stationary abrasive grains; distribution, wetting and final adhesivity cannot be assisted by mechanical agitation, motion or shear, such as is applied advantageously, for example, in the preparation of concrete.

Liquid addenda which serve to suspend and/or plasticize the solid resin particles prior to fusion of the latter are helpful to the extent to which they establish actual liquid contact, provided that they do not interfere with the bond formation through incompatibility, boiling, or permanent plastification.

The porosity of the structure should be maintained during the bonding process so that the final article meets exact specifications as to abrasive, bond and pore volume. This requires that the cold-molded article should neither shrink nor settle as the bond material melts, nor swell through the evaporation of volatile constituents, addenda, or reaction products in the bond. Hence, the bonding material, though required to become sufficiently fluid during the process, should, at the same time, retain enough viscosity to preserve the porous structure of the molded body.

Most thermosetting resinoid bonding materials evolve water as a reaction product during the curing process. Depending on the temperature at which most of this evolution occurs and the physical state the resin has attained, the formation and evaporation of water may cause serious distortion and swelling of the structure. In phenol-aldehyde resins, for example, the maximum rate of water formation occurs well above its boiling point, hence under considerable pressure, and at a stage where the resin has reached a tenacious consistency. To suppress swelling, relatively large amounts of agents like calcium oxide or plaster of Paris have been included in the composition whose sole function was to absorb the water as it was formed but which otherwise have had only undesirable effects, e.g., on the cutting ability of the abrasive. In order to be effective, these water-absorbing agents should be used in a reasonably fresh condition and the moldings must not be over exposed to atmospheric humidity before curing. My invention avoids the disadvantages attending the use of such water absorbing agents.

Other objects will be in part obvious or in part pointed out hereinafter.

The resins of the invention belong to the general class of aromatic amine-aldehyde condensation products but, in accordance with the stated objectives, they are highly specific and novel embodiments of the former.

The aromatic amines useful in the invention are poly-anilines, i.e., possessing at least two amino benzene groups per molecule, the benzene nuclei being linked directly or through an interposed central structure. For example,

where X may be a methylene, ethylene, ethylidene, higher alkylene, oxygen, sulfur, imine group, etc. and R, R' are hydrogen or alkyl. The benzene nuclei may be substituted by alkyl, aryl groups, halogen, etc.

The preferred poly-anilines of this type are di-anilines, especially pp'-diamino diphenyl methane

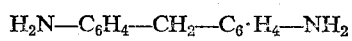

and methylol-substituted homologues thereof.

The preferred aldehydes are furfural and mixtures of furfural with other aldehydes.

The di-anilines are solids which are soluble in furfural up to and in excess of equimolar proportions. In the absence of catalytically active acidic substances these liquid solutions are stable at room temperature. On heating and/or upon addition of small amounts of catalysts they react, becoming deep-red viscous liquids and finally black infusible and insoluble masses.

The reaction is very sensitive to even minute amounts of acidic substances which frequently are present as impurities in the raw material, such as e.g., furoic acid in furfural. In consequence, the behavior of a mixture of di-aniline and furfural is unpredictable; it may rapidly react even under storage conditions or too sluggishly on curing at elevated temperatures.

I have found that addition of sufficiently basic substances is an effective means to stabilize such mixtures, so that they can be stored and manipulated without spontaneous and uncontrolled further reaction. However, when these mixtures are to be activated prior to use, it again is difficult to estimate the exact amount of acidic catalyst to be added so as to neutralize the basic stabilizing agent (in the presence of the weakly basic di-aniline) and to establish the exact excess of catalyst required for optimum reactivity and uniform results in the product. Besides, the neutral salt thus introduced is an undesirable contamination.

I have found further, that certain bases which are effective stabilizers form salts with certain acids which, though neutral or nearly neutral, are effective catalysts. Therefore, a mixture of dianiline and furfural stabilized with such a base does not change under storage conditions, but responds readily to the addition of small amounts of catalyst; though present in substantial stoichiometric excess, the base does not interfere with the activity of the catalyst.

Bases useful in the manner defined above are, e.g., ammonia, pyridine, morpholine, etc. Most of these react with furfural and other aldehydes used in the potentially reactive mixture and, therefore, not the nitrogeneous base themselves but their respective reaction products with aldehydes are the actual stabilizing agents. Hence, the group of effective and useful stabilizers which do not interfere with subsequent activation include, e.g., hexamethylene tetramine $(CH_2)_6N_4$; hydracetamide, $(CH_3 \cdot CH)_3N_2$; hydrofuramide $(C_4H_3O \cdot CH)_3N_2$; hydrobenzamide, $(C_6H_5 \cdot CH)_3N_2$ and their analogs.

Since furfural is one of the two principal constituents of the mixtures considered in the present invention, whereas other aldehydes are optional, hydrofuramide is the preferred stabilizer. This base is formed by furfural and ammonia and, reversely, decomposes into these components under curing conditions; hence no extraneous matter is introduced into the resin composition. Hydrofuramide is easily soluble in furfural and such solutions, prepared by dissolving either hydrofuramide or its equivalent of strong aqueous ammonia in furfural are miscible with, but do not react with, the dianiline. Upon mixing the dianiline with a solution of about 2% to 20% hydrofuramide in furfural, a homogenous liquid is obtained which remains unchanged under normal atmospheric conditions.

The proportion of furfural to di-aniline is variable. Homogeneous cured products are obtained if not less than one mole furfural is employed per amino nitrogen equivalent of the di- or poly-aniline. An excess of furfural above this proportion acts mainly as a diluent and is volatilized in the course of the curing treatment. However, the presence of excess furfural is mostly desirable because its efficiency as a solvent tends to assure homogeneity in the final product.

I have found it to be advantageous to modify the properties of the condensation product of di-aniline and furfural by means of using, in addition to furfural, a minor amount of another aldehyde, such as, e.g., formaldehyde, acetaldehyde (in their various forms), butyraldehyde, aldol, croton aldehyde, benzaldehyde, etc. For the purpose of bonding abrasive grains, e.g., of fused aluminum oxide, formaldehyde, in a quantity between approximately 0.10 to 0.80 mole equivalents per aminonitrogen of the di-aniline, together with about 1.00 to 1.50 mole equivalents furfural has been found most suitable.

While the presence of a basic stabillizing agent such as hydrofuramide, prevents the condensation reaction to proceed beyond the formation of a viscous liquid, the addition of minute amounts of catalysts to the stabilized mixture enables it rapidly to progress towards a fully condensed, insoluble and infusible state at elevated temperature. Suitable catalysts are acids like hydrochloric, sulfuric, phosphoric, chloroacetic, oxalic, succinic, furoic and many other acids as well as their ammonium, aryl amine, and other salts of weak bases, e.g., ferric, zinc, magnesium, aluminum, etc. In general, those catalysts are effective which are capable of reacting with the amino groups of the di-aniline to form salts or amides thereof; thus, free acids which form di-aniline salts directly, their ammonium salts which do the same under liberation of ammonia, or salts of weak metal bases which are freed as such or as basic salts; and certain acids or salts thereof which form amides with the di-aniline as, e.g., ammonium thiocyanate, producing a thiourea. The catalysts meeting with the foregoing conditions are effective in the presence of hydrofuramide. The quantity of catalyst required varies, depending on its nature and the desired rate of reaction under given conditions, between about 0.5% to 10% by weight of the di-aniline.

The following examples serve to illustrate the preparation of the stable but potentially reactive liquid resin compositions, with the exception of Example 1 which shows the behavior of a typical unstable furfural-di-aniline mixture.

*Example 1*

One hundred cubic centimeters of commercial furfural were added to 100 grams finely powdered pp'-diamino diphenyl methane. An exothermic reaction took place immediately. The mixture at once assumed an intensely red color which turned to purple and finally to black, while its consistency changed from a liquid to a plastic solid and, on heating above 65° C., to a brittle insoluble, and ultimately, infusible mass.

*Example 2*

One hundred cubic centimeters of a solution of 10 grams of hydrofuramide in furfural were added to 100 grams of finely powdered pp'-diamino diphenyl methane, as in Example 1. Only a slow reaction occurred and the mixture remained stable at room temperature in the form of a brown viscous fluid or paste which liquefied without further reaction as the temperature was raised. It solidified, without becoming insoluble, after several hours heating at 100° C.; even after 20 hours at 150° C. it still showed slightly solubility in pyridine.

Upon addition to the original mixture as described in the foregoing, of 0.50 grams furoic acid, it behaves essentially as described in Example 1. If molded under pressure and heated to at least 100° C., it forms a strong, insoluble and infusible black body of high utility.

*Example 3*

One hundred fifty grams of a commercial product ("Tonox," Naugatuck Chemical Company) consisting substantially of diamino diphenyl methane and methylol-substituted homologues thereof and having a nitrogen content of 12.8% were fused with 15 cubic centimeters of a coal tar oil boiling between 150° C. and 180° C. To the cooled viscous mixture were added 10 grams of powdered paraformaldehyde under efficient stirring. After the latter had been thoroughly distributed, 150 cubic centimeters of solution of 10 grams hydrofuramide in furfural were admixed under stirring.

The resulting composition was a brown viscous liquid substantially stable at room temperature. However, upon addition of an active catalyst, e.g., 1.0 gram of ferric chloride dissolved in about 5 cubic centimeters of acetone, condensation as indicated by the typical red coloration began at once and proceeded slowly at room temperature to a solid stage within several hours. This transformation can be controlled at a desired rate by varying the amount of catalyst and/or the temperature of storage, and the material can be cast, cold-molded or hot-molded or serve to impregnate a fabric or porous body. It attained a completely insoluble and infusible state by baking at temperatures between about 130° C. and 160° C.

Example 4

Thirty grams "Tonox" and three cubic centimeters of coal tar oil (as in Example 3) were fused together and cooled to room temperature. Three cubic centimeters of paraldehyde (trimeric acetaldehyde) were added, followed by thirty cubic centimeters of a solution of 10 grams hydrobenzamide in furfural. The mixture, a viscous liquid, did not change its consistency when stored at room temperature but cured rapidly to an infusible body upon addition of a solution of 0.10 grams ammonium thiocyanate in one cubic centimeter of furfural, and heating at 140° C.

Example 5

This was the same as Example 3 except that I added 30 grams of benzaldehyde instead of 10 grams of paraformaldehyde to the cooled viscous mixture.

Example 6

This was the same as Example 3 except that I added 55 grams chloral hydrate instead of 10 grams of paraformaldehyde to the cooled viscous mixture.

Example 7

One hundred twenty grams "Tonox" and 30 grams benzidine were blended with 15 cubic centimeters of coal tar oil and mixed further with paraformaldehyde and furfural as described in Example 3.

The resulting stable mixture was activated by the addition of 1.0 gram ammonium thiocyanate freshly dissolved in a few cubic centimeters of furfural and then cured as in Example 3.

Example 8

This was the same as Example 7 using 20 grams of p-phenylene diamine instead of 30 grams benzidine. Two grams of finely powdered aniline sulfate were used as catalyst.

The foregoing examples in no way limit the invention either with regard to proportions of the constituents or their specific nature; it is of no concern whether or how much of a diluent or solvent is used, and any one or any mixture of the catalysts specified activates any one of the stabilized mixtures. Included without necessity of specific examples is the admixture of inert fillers, fibers, pigments, mold lubricants and other materials of an accessory function.

The cured compositions obtained by the use of the present invention are of good strength; they are good thermal and electrical insulators and can be extruded, injected, transfer-molded, machined and ground.

As an illustration of a typical application of the compositions disclosed in the foregoing, the making of a porous grinding wheel is described as follows:

Example 9

A stablized resin mixture was prepared by melting together 950 grams "Tonox" and 95 cubic centimeters of coal tar oil. After cooling, 65 grams of paraformaldehyde were stirred into the viscous liquid, followed by admixture of a solution of 65 grams of hydrofuramide in 900 cubic centimeters of furfural, under cooling and stirring.

This mixture which is stable at room temperature, provides the resinous bond for the grinding wheel in the course of the subsequent steps. The quantities of the materials, as shown, are calculated to produce a grinding wheel containing 54% by volume of abrasive, 30% by volume of bond and 16% by volume, of air pores.

To the stabilized resin were added, under forceful mechanical agitation, 32 pounds of abrasive (fused aluminum oxide; grain size 16 mesh), 2.65 pounds of finely powdered cryolite, 0.40 pound "Aroclor 1268" (chlorinated biphenyl, Monsanto Chemical Company), the latter two acting as reinforcing fillers.

When uniform admixture had been attained, a solution of 50 grams of ammonium chloride and 10 grams of ammonium thiocyanate in 270 cubic centimeters of water was added. The original tan-colored mixture became deep red and finally purple, while it became very viscous. Preferably the mixing is followed by heating at 50° C. for about one day to render the conglomerate mass rigid enough to be broken down into granular form.

37.5 pounds of this material were wetted with 220 cubic centimeters of pentachloro ethane and molded cold into a circular wheel 16 inches in diameter, 2 inches in width and having a center hole of six inches in diameter. The molding was firm and held its dimensions without sagging or expanding while being cured at temperatures gradually raised to, and maintained at 150° C. for about 24 hours.

The grinding wheel thus produced was strong, durable and its grinding efficiency high.

Example 10

A cutting-off wheel which had the shape of a thin disc 6 3/16 inches in diameter and 100 thousands of an inch thick which was employed for cutting off lengths of material and for cutting grooves, was made from 124.8 grams of the same composition as described in Example 9. This wheel was cured for 33 hours at temperatures up to and including 140° C. The resulting wheel cut well and showed good strength.

The potentially reactive composition according to the invention comprises a substance containing at least two aryl amino groups per molecule, furfural and the ammonia derivative of an aldehyde. Preferably the substance containing at least two aryl amino groups per molecule and the furfural are the principal reaction ingredients and are present in molar ratios of furfural to amino-nitrogen of between 2:1 and 1:2 respectively, and the ammonia derivative of an aldehyde which prevents the reaction between the principal reaction ingredients is present in quantities between 1% and 25% by weight of the furfural. The substance is preferably selected from the group consisting of p,p'-diamino diphenyl methane and methylene and methylol derivatives thereof. The substance may also advantageously include, in addition to the foregoing, a phenylene diamine, benzidine or any other polyamine derivative of benzene or diphenyl. Preferred examples of the component for preventing reaction between the substance and furfural which is, as above stated, an ammonia derivative of an aldehyde, are hydrofuramide, aldehyde ammonia, and hydrobenzamide.

It will thus be seen that there has been provided by this invention a potentially reactive resin composition, a process for catalyzing it and a reacted resin produced therefrom in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

I claim:

1. A composition capable of being transformed with a high degree of certainty of reaction results into a thermoset resin which comprises a diamino dimonocyclicaryl methane, furfural, an ammonia derivative selected from the group consisting of hexamethylene tetramine, hydracetamide, hydrofuramide and hydrobenzamide, and an acidic catalyst, the molar ratio of furfural to amino nitrogen in the diamino compound being between about 1 to 1 and 1.5 to 1, the amount of said ammonia derivative being between about 2 to 20% by weight of said furfural, and the amount of said catalyst being between about 0.5 to 10% by weight of said diamino compound.

2. A composition capable of being transformed with a high degree of certainty of reaction results into a thermoset resin which comprises a diamino compound selected from the group consisting of p,p'-diamino diphenyl methane and methylol-substituted p,p'-diamino diphenyl methanes, furfural, an ammonia derivative selected from the group consisting of hexamethylene tetramine, hydracetamide, hydrofuramide and hydrobenzamide, and an acidic catalyst, the molar ratio of furfural to amino nitrogen in the diamino compound being between about 1 to 1 and 1.5 to 1, the amount of said ammonia derivative being between about 2 to 20% by weight of said furfural, and the amount of said catalyst being between about 0.5 to 10% by weight of said diamino compound.

3. A composition capable of being transformed with a high degree of certainty of reaction results into a thermoset resin which comprises p,p'-diamino diphenyl methane, between about 1 and 1.5 mols of furfural for each mol of amino nitrogen in said diamino ingredient, about 2 to 20% by weight of hydrofuramide based upon the amount of furfural and 0.5 to 10% by weight of an acidic catalyst based upon the weight of said diamino ingredient.

4. A composition capable of being transformed with a high degree of certainty of reaction results into a thermoset resin which comprises a diamino ingredient consisting of a mixture of p,p'-diamino diphenyl methane and methylol-substituted p,p'-diamino diphenyl methanes, between about 1 and 1.5 mols of furfural for each mol of amino nitrogen in said diamino ingredient, about 2 to 20% by weight of hydrofuramide based upon the amount of furfural and 0.5 to 10% by weight of an acidic catalyst based upon the weight of said diamino ingredient.

5. A composition as claimed in claim 1 which, in addition to furfural, contains a minor amount of another aldehyde from the group consisting of formaldehyde, acetaldehyde, butyaldehyde, aldol, croton aldehyde and benzaldehyde.

6. A method which comprises preventing reaction of a potentially reactive mixture of furfural and a diamino dimonocyclicaryl methane to give an infusible reaction product before the positive addition of an acidic catalyst to the mixture by incorporating an ammonia derivative of an aldehyde selected from the group consisting of hexamethylene tetramine, hydroacetamide, hydrofuramide and hydrobenzamide in said mixture, subsequently adding between about 0.5 to 10% by weight, based on the weight of said diamino compound, of an acidic catalyst to the resulting mixture and then containing the catalyzed mass in a shaping means while the mass is transformed into an infusible mass.

7. A method which comprises preventing reaction of a potentially reactive mixture comprising furfural and p,p'-diamino diphenyl methane to give an infusible reaction product before the positive addition of an acidic catalyst to the mixture by incorporating about 2 to 20% hydrofuramide, based upon the weight of said furfural, in said mixture, subsequently adding between about 0.5 to 10% by weight, based upon the weight of said diamino compound, of an acidic catalyst to the resulting mixture and then containing the catalyzed mass in a shaping means while the mass is transformed into an infusible mass.

References Cited in the file of this patent

UNITED STATES PATENTS

| | | |
|---|---|---|
| 2,029,954 | Sutter | Feb. 4, 1936 |
| 2,038,142 | Sutter | Apr. 21, 1936 |
| 2,156,124 | Novotny | Apr. 25, 1939 |
| 2,416,262 | Kistler | Feb. 18, 1947 |
| 2,545,692 | Gleim | Mar. 20, 1951 |